July 28, 1964    A. K. KUEHNE    3,142,550
PLASTIC FILTER FRAME
Filed June 1, 1962
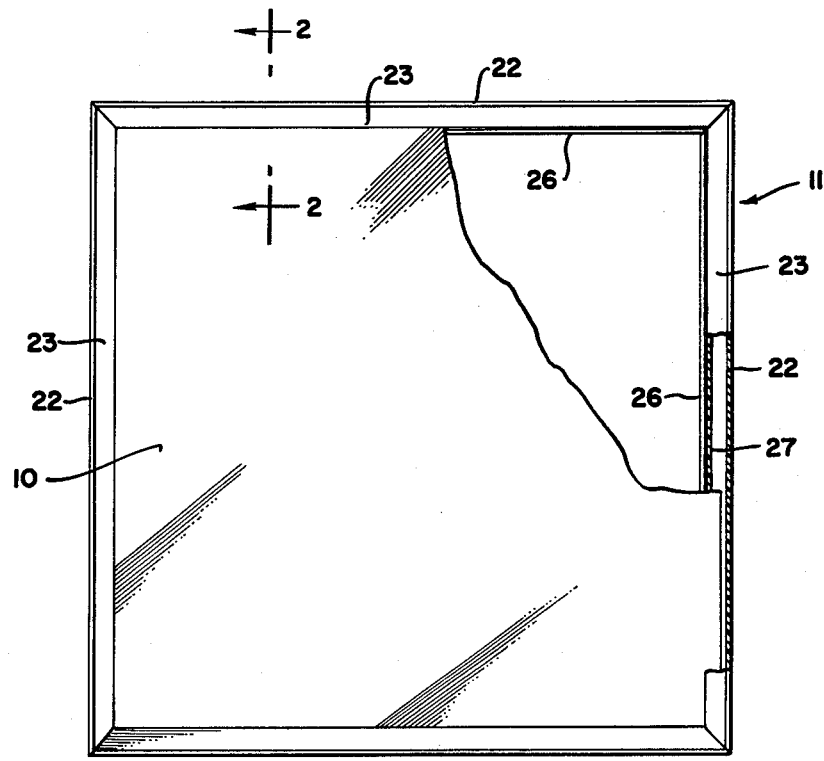
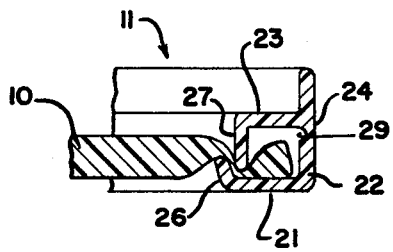
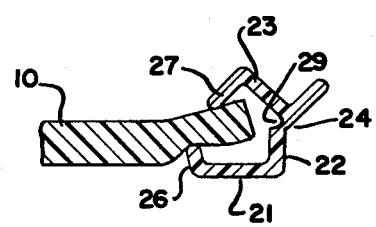
INVENTOR.
ALFRED K. KUEHNE
BY
Cullen, Sloman & Cantor
ATTORNEYS 3,142,550
PLASTIC FILTER FRAME
Alfred K. Kuehne, Garden City, Mich., assignor to
Fibercraft Products, Inc., Detroit, Mich.
Filed June 1, 1962, Ser. No. 199,511
1 Claim. (Cl. 55—495)

This application relates to filters and particularly to filters characterized by having rigid peripheral frames.

An object of the invention is to provide a rigidly framed filter having certain novel and important characteristics, all as will best be understood upon reference to the specification which follows and to the appended drawing.

In the drawing:

FIG. 1 is a fragmentary small scale top plan view of a filter.

FIGS. 2 and 3 are enlarged fragmentary cross-section views as if on line 2—2 of FIG. 1, but showing the parts in various positions relatively.

The filter shown in the drawing comprises a filter pad 10 and a supporting frame referenced generally 11. The filter pad is a rectangular sheet of soft compressible filtering material of any suitable form and composition. In a preferred embodiment it is a sheet of polyurethane foam.

The rectangular rigidifying frame 11 extends around and receives the edge of the pad and has an angular cross-section as shown defining two angularly related legs 21 and 22. The first or horizontal leg 21 seats the filter pad. The second or vertical leg 22 surrounds and protects the edge of the pad.

Within the frame is a clamping strip 23 whose upper edge is hingedly secured at 24 to the leg 22 of the frame. The lower edge of the clamping strip 23 is disposed at an angle to the pad seating leg 21 of the frame and engages the pad 10 to clamp it against the pad seating leg 21 of the frame.

The inner edge of leg 21 has a formation in the form of a bead 26 for cooperating with the lower edge 27 of the clamping strip 23, past which formation or bead 26 such clamping strip edge 27 may be moved in its hinged movement as shown, for locking the clamping strip in pad holding position.

The frame and clamping strip are integral and the hinge connection between them is a score line or groove 29 defining the hinge axis and located midway between the upper and lower edges of the leg 22.

The frame and clamping strip are of a molded plastic material such as polypropylene which permits repeated relative flexing of the strip and the frame at the hinge-providing score line 29.

Such material, which can be purchased under the trademark "Polypro," is a thermoplastic moldable material which can be flexed or bent indefinitely and repeatedly on a preformed hinged line such as a groove scribed or molded in the material.

The frame may be molded in a one-piece hollow rectangle to form a rigid peripheral frame in which the filter pad or foam or other material is laid down, after which the clamping strip is snapped down into closed position as shown in the drawing for locking the pad into place.

If desired, grid bars and cross bars may be molded with the frame. While the grid has been referred to as integrally moldable with the frame, it can be a separate member.

Likewise, while the frame hereof has been disclosed as a one-piece molding extending around the pad and including the clamping strip as well, it will readily be understood that the frame and the clamping strip together can be molded as a molding of continuous length and cut to dimension, the corners mitered and joined to form a rectangular frame resembling a picture frame. The corner joints may be formed by any sutiable adhesive material or by using corner joint elements of any suitable design.

Because the strip 23 can be manually flexed up and down repeatedly without deformation or special tools, the frame hereof permits replacement or washing of filter pads repeatedly, a primary objective of the invention. The plastic material, as contrasted from metal, in the construction hereof, enables the result hereof to be obtained.

Now having described the filter herein disclosed, reference should be had to the claim which follows.

I now claim:

A filter frame for a soft foam filter pad;
said frame being a one piece unitary frame of flexible molded plastic material comprising a base and a clamping strip;
the base comprising a horizontal base part, an outer vertical base part at the outer edge of the horizontal base part, and an inner vertical base part at the inner edge of the horizontal base part;
the clamping strip being integral with the base and comprising a horizontal strip part whose outer edge is integrally and hingedly connected to an upper portion of the outer vertical base part;
and having a vertical strip part whose upper edge is integrally connected to the inner edge of the horizontal strip part;
with the vertical strip part being between the two vertical base parts and closely adjacent to the inner vertical base part for frictionally gripping to the inner vertical base part if and when the edge of a foam filter pad is inside the frame and rests on the upper edge of the inner vertical base part with the pad edge disposed in the space between the vertical parts of the base;
the inner vertical base part projecting upwardly from the horizontal base part a considerable distance to overlie the vertical strip part a substantial enough distance to insure gripping between the inner vertical base part and the vertical strip part when a soft filter has its edge disposed between the inner vertical base part and the vertical strip part whereby to insure proper clamping action;
there being a score line inside of and at the hinge connection between the horizontal strip part and the outer vertical base part which permits repeated flexing of the strip relative to the base.

References Cited in the file of this patent
UNITED STATES PATENTS

| 2,935,157 | First | May 3, 1960 |
| 3,058,279 | Metcalfe | Oct. 16, 1962 |
| 3,060,606 | Peach | Oct. 30, 1962 |
| 3,072,229 | Pasche | Jan. 8, 1963 |